Feb. 1, 1944.  G. M. GRAHAM  2,340,587
AUTOMOBILE STRAIGHTENING APPARATUS
Filed Jan. 31, 1941  4 Sheets-Sheet 1
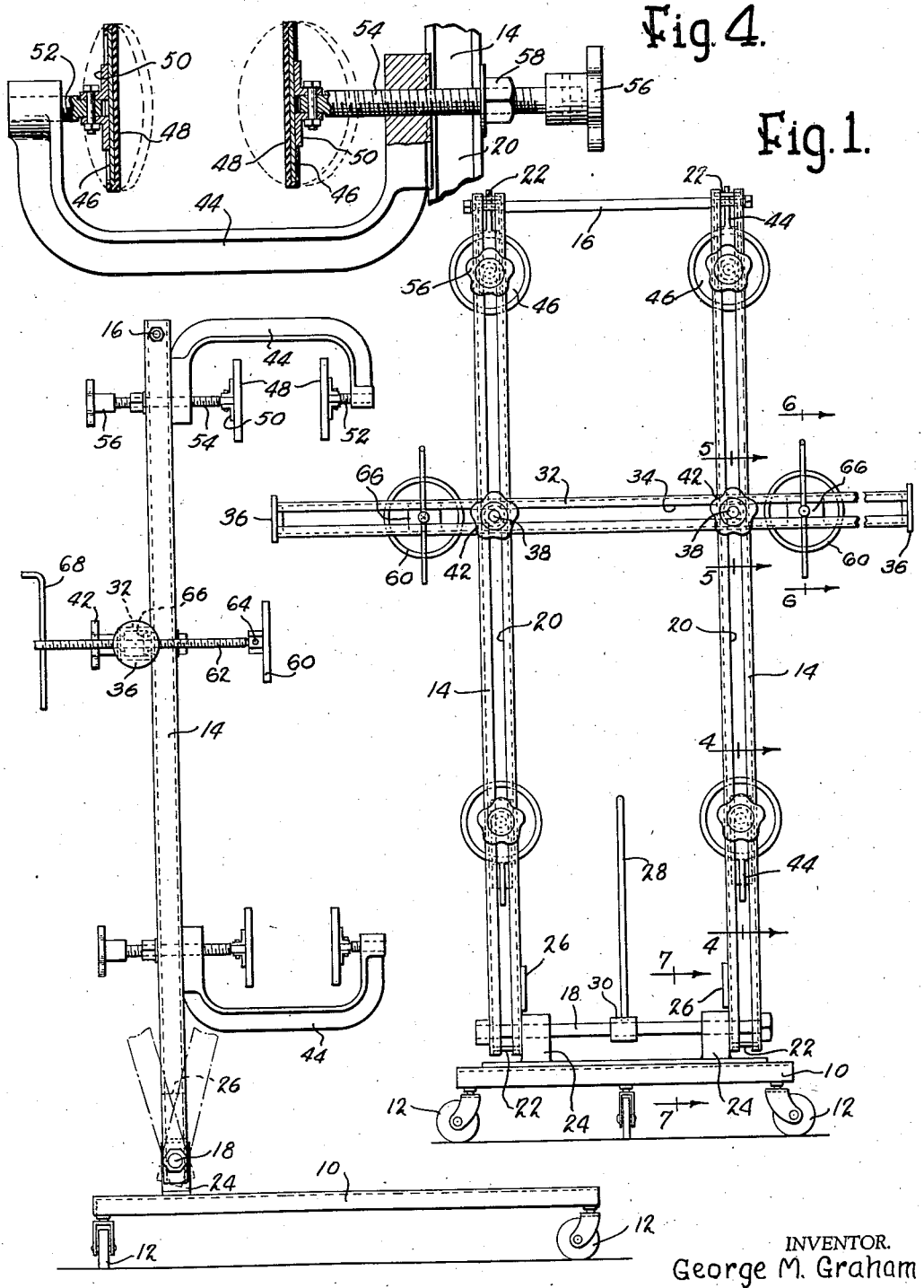
INVENTOR.
George M. Graham
BY Parker and Burton
Attorneys Feb. 1, 1944. G. M. GRAHAM 2,340,587
AUTOMOBILE STRAIGHTENING APPARATUS
Filed Jan. 31, 1941 4 Sheets-Sheet 2
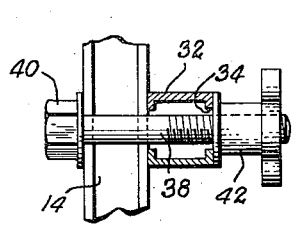
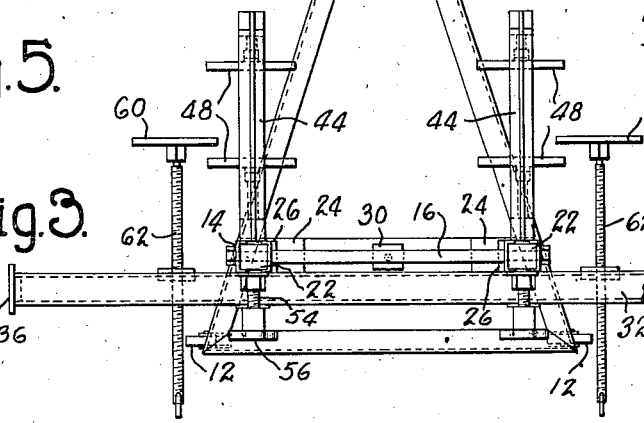
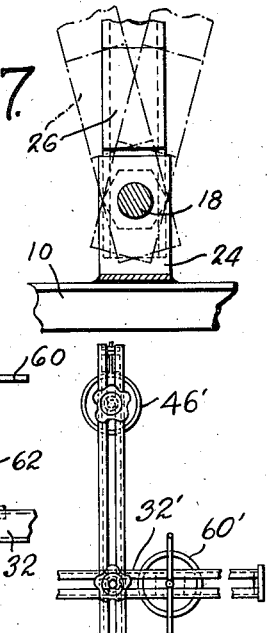
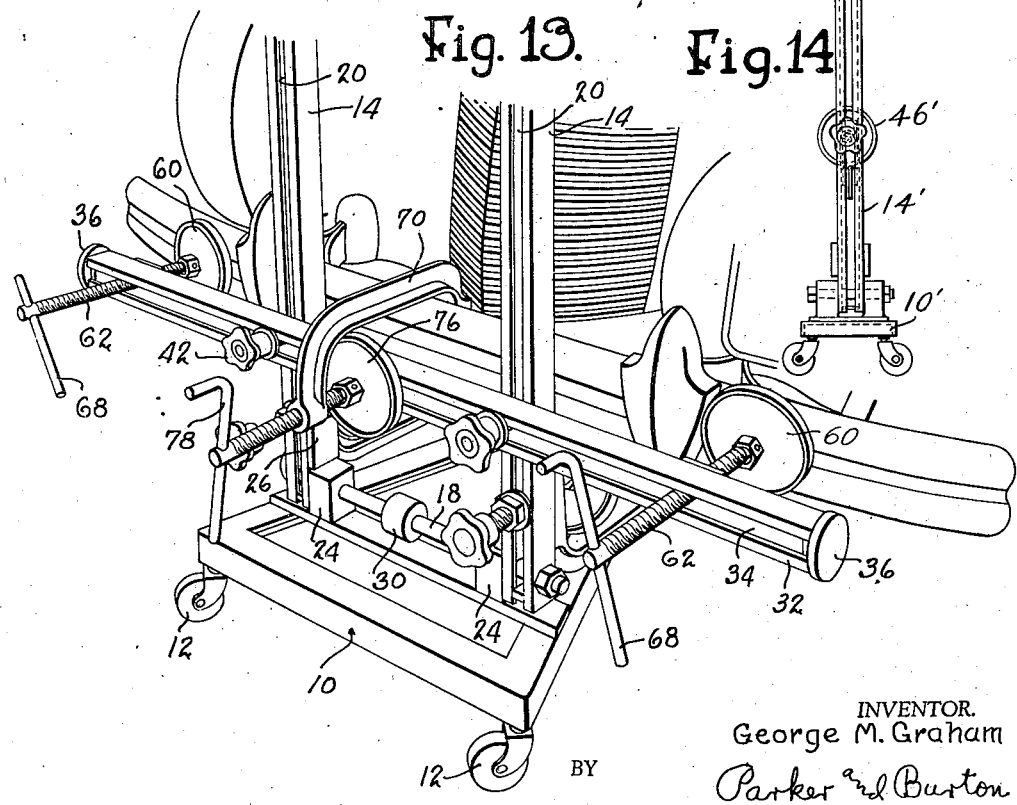
INVENTOR.
George M. Graham
BY Parker and Burton
Attorneys Feb. 1, 1944.  G. M. GRAHAM  2,340,587
AUTOMOBILE STRAIGHTENING APPARATUS
Filed Jan. 31, 1941  4 Sheets-Sheet 3
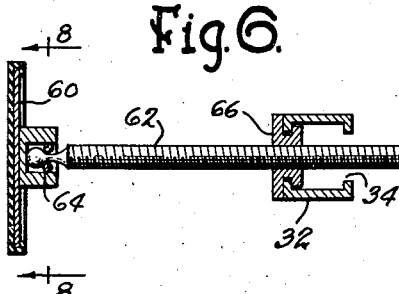
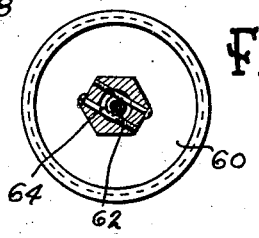
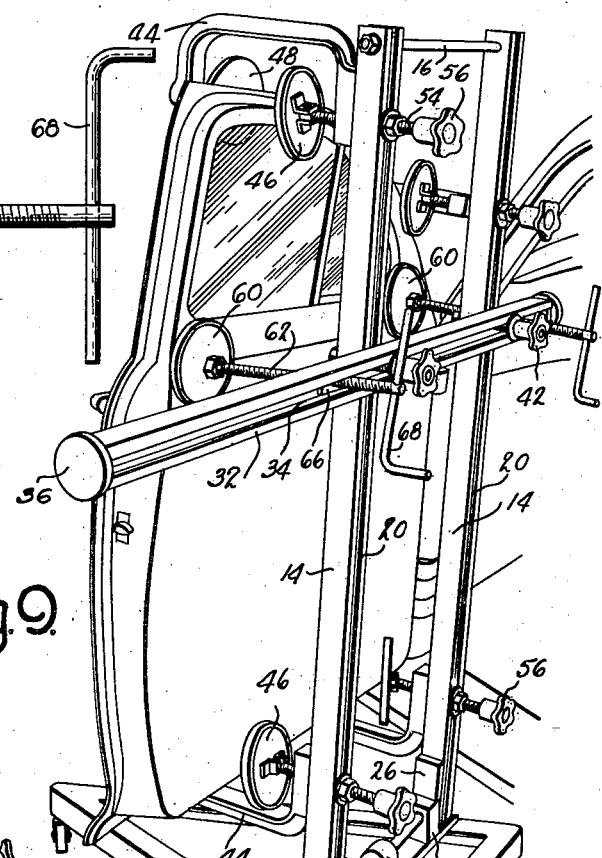
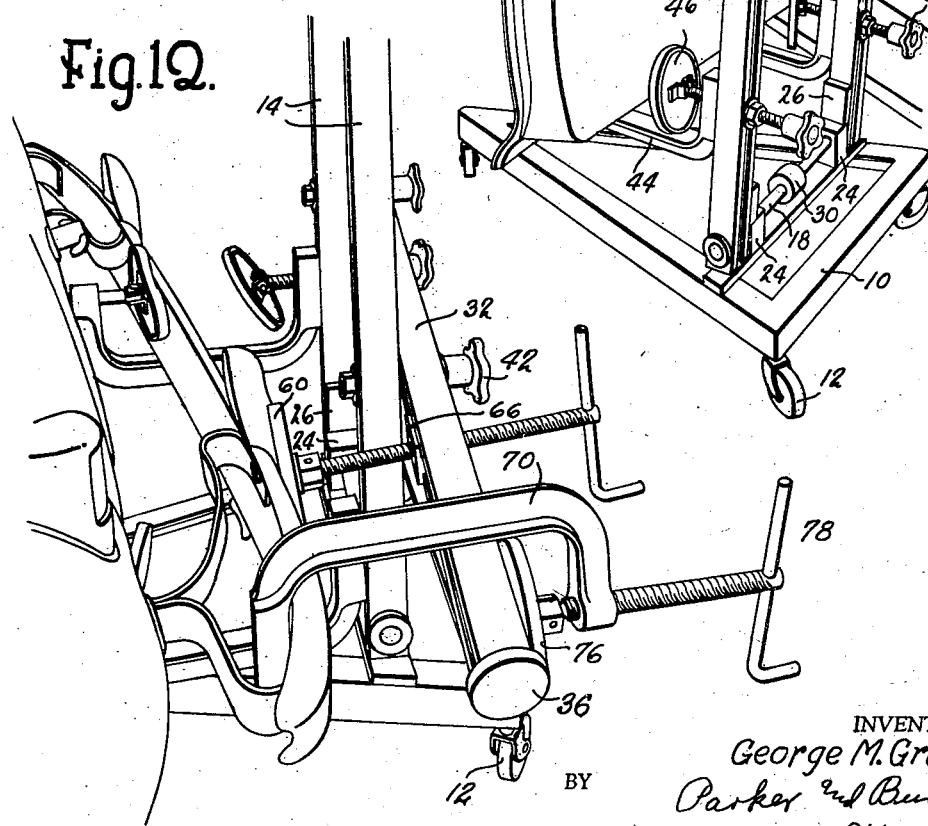
INVENTOR.
George M. Graham
Parker and Burton
Attorneys

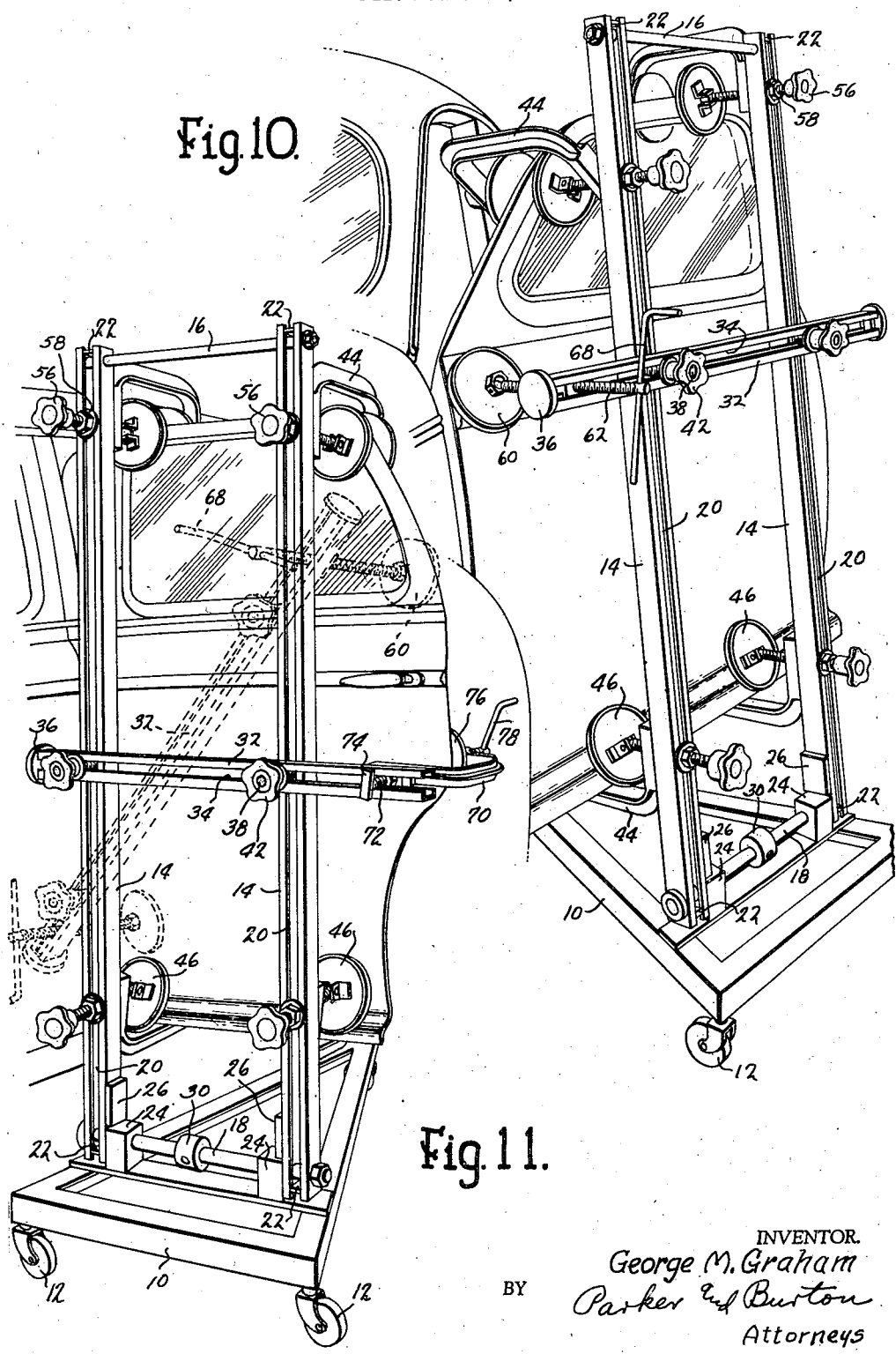

Patented Feb. 1, 1944

2,340,587

UNITED STATES PATENT OFFICE 2,340,587

AUTOMOBILE STRAIGHTENING APPARATUS

George M. Graham, Detroit, Mich., assignor to Hinckley-Myers Company, Jackson, Mich., a corporation of Michigan Application January 31, 1941, Serial No. 376,803

14 Claims. (Cl. 153—32)

This invention relates to apparatus for repairing damaged and defective parts of automobiles and particularly to a tool for straightening damaged or warped doors, bumpers and other parts of the automobile while on the automobile and for serving as a support or bench for repairing parts removed from an automobile.

An important object of this invention is to provide improved apparatus for straightening damaged and warped parts of automobiles such as the doors and bumpers thereof without requiring their removal from the automobile. Another important object of this invention is to provide a novel tool which can be attached directly to damaged or bent parts of an automobile and in a few moments straighten out the defective parts.

Another object of this invention is to provide a tool of this character which is universal in application. It is provided with novel holding and clamping devices capable of practically universal adjustment. The universal adaptability of the apparatus enables it to correct any type of bent or warped damage suffered by the doors and bumpers of an automobile without requiring their removal from the car.

More particularly, it is an improved object of this invention to provide an improved apparatus for the purpose described which need not be lifted manually to locate the apparatus on the part of the automobile to be straightened but is provided with a novel mounting capable of moving the apparatus over the floor and while on the floor to attach the apparatus to the doors or bumpers of the automobiles required to be straightened. In one embodiment of the invention the apparatus comprises a base member movable over the floor and two upright members secured to the base member in parallel spaced relationship. One or more novel cross members are provided which are adjustably coupled to the vertical members and capable of being shifted to various positions on the vertical member. Both the upright member and the cross member are shaped in a novel way to form guides for a plurality of holding and clamping devices. The latter are slidably received in the guide of the member and are capable of adjustment to various positions with respect thereto. By properly positioning the apparatus upon a door, either on the inside or the outside of the door or adjacent to or remote from the hinged edge thereof, it is possible by judiciously shifting the cross member and the holding and clamping devices to apply pressure at the right point to straighten out damaged or warped parts of the door. The apparatus is used in the same way when applied to bumpers or covers over the trunk compartment of the vehicle.

Various other advantages and meritorious features will become more fully apparent from the following specification, appended claims and accompanying drawings wherein:

Figure 1 is a front elevation of an apparatus constructed in accordance with the invention, Fig. 2 is a side elevation of the apparatus of Fig. 1, Fig. 3 is a top view of the apparatus of Figs. 1 and 2, Fig. 4 is a view of one of the clamping devices employed on the apparatus.

Fig. 5 is a detail view illustrating the manner of adjustably securing the cross member to the upright members, Fig. 6 is a detail view of one of the pressure applying devices adapted to be adjustably mounted upon the apparatus, Fig. 7 is a detail view illustrating the manner of pivotally mounting the upright portion of the apparatus to the base portion in order to provide limited swinging movement of the upright portion from the vertical, Fig. 8 is a detail view illustrating the manner of securing a clamping head to either one of the holding or pressure applying devices, Figs. 9, 10 and 11 are perspective views illustrating three ways of using the apparatus for straightening different parts of a door on an automobile, Figs. 12 and 13 are perspective views illustrating two different ways of applying the apparatus for straightening the bumper on an automobile, and Fig. 14 is an elevation of a modified form of structure utilizing one upright member.

The primary embodiment of the invention illustrated and described herein comprises in general a base movable from the floor and an upright structure carrying holding and pressure applying devices which are adjustable to various positions to effect operation of the apparatus. Referring particularly to the drawings, the base member is in the form of a triangular frame 10 provided with depending casters 12 for rolling engagement with the floor. Surmounting the base is the upright structure previously referred to. It is composed of two similarly shaped members 14—14 arranged in parallel spaced relationship and joined at the top by a rod 16 and at the bottom by a rod 18, thus forming a substantially coplanar structure.

Each upright member 14 is formed with a longitudinally extending slot 20 running, as illustrated, the length of the member and opening out on opposite sides thereof. Each member 14 is preferably formed as shown by two channel-shaped elements disposed with their channels opening toward one another. To form the slot 20 previously referred to, the channel-shaped elements are spaced from one another so that the side sections thereof form the slot opening on opposite sides of the structure. The channel elements of each upright member are held together in fixed relationship by connecting pieces 22 at the opposite end. It will therefore be seen that the slots 20 extend the full length of the members 14 and open in the same direction on opposite sides of the structure. It is obvious that the members 14 and the slots 20 may be constructed in other ways. For example, the slots 20 may extend only for part of the full length of the members 14 or be divided into separate sections.

The structure formed by the members 14—14, although normally disposed in upright position, is permitted a limited swinging movement from the vertical which improves its adaptability for various uses. This is accomplished in the illustrated embodiment of the invention by rotatably mounting the lower connecting rod 18 in a pair of journal blocks 24—24 secured to the base member 10. On each member 14 is a plate 26 which is disposed in slightly spaced relationship above the top of the nearest journal block and cooperates therewith to limit the extent of swinging movement of the upright members. As is apparent, the bottom of the plates 26 will strike the top of the journal blocks when the structure is swung from one side to the other side of the vertical and thus serve as a stop limiting the swinging movement of the structure to a few degrees on either side of the vertical. The amount of clearance between the plates and the journal blocks will determine the extent of swinging movement permitted. In the structure illustrated the clearance between the plate and the journal blocks allows the structure to swing 15° on either side of the vertical. Other suitable means may be provided for limiting the swinging movement of the structure. To assist in rocking the structure through its prescribed angle of movement, a lever 28 is provided which is removably attached to a collar 30 fixed on the cross rod 18.

The upright structure is provided with one or more cross members similar in construction to longitudinally extending members 14—14. One such cross member is shown at 32 in the drawing. It is formed of two channel-shaped elements disposed with their channel facing one another and spaced from one another to form a slot 34 extending the length of the cross member and opening out through the opposite sides thereof. The channel elements forming the cross member 32 are predisposed in spaced relationship by circular cup-like members 36 formed with shoulders which enter the channels to space the elements apart.

The cross member 32 is adjustably connected to the upright members by novel means which permit universal adjustment of the cross member in the plane of the upright members. This is accomplished by providing connecting bolts 38 (see Fig. 5) which extend through the slots of both the cross members and the upright members 14—14. One end of each bolt 38 is provided with a head 40 which holds the bolt from completely passing through the slot. The opposite end of each bolt is externally threaded and receives the collar 42 provided with a handle for facilitating turning movement thereof. When threaded, the collar acts to clamp the cross bar in any position to which it is adjusted on the upright members. The bolts 38 are capable of slidable adjustment up and down in the slot 20 of the upright members. The cross member is both slidably and rotatably adjustable on the bolt members 38. It is thus possible by virtue of this connection to provide practically universal adjustment of the cross member in the plane of the upright members.

Slidably adjustably mounted on both the longitudinal and cross members are holding clamps which are adapted to grip the doors, bumpers, and other parts of an automobile during the straightening operation. One such holding clamp is illustrated in Fig. 4. In general, each holding clamp is in the form of a bracket carrying inwardly facing gripping surfaces which are adjustable toward and away from one another for engagement with opposite sides of a door or bumper or other parts of an automobile. Specifically, each bracket is in the form of a U-shaped frame 44 one end of which is adapted to abut against either an upright member or the cross member of the apparatus. The ends of the U-shaped frame 44 are provided with aligned apertures which receive and hold adjustable gripping heads which are similar in construction and face toward one another. Each gripping head is preferably formed by a plate 46 having its face directed toward the other head covered or coated with yieldable material such as a rubber sheet 48. The rubber surfaces 48 of each gripping head face toward one another as indicated in Fig. 4. To the back side of each plate 46 is secured a collar 50 which pivotally attaches the plate to a bolt-like member which extends through an aperture in the end of the U-shaped frame 44. The connection of the head to its respective bolt-like member is such that each head may be swung to various angles as indicated in dotted outline in Fig. 4. This allows each head to adapt itself to the curvature or inclination of the part which it engages.

The bolt-like members previously referred to for supporting the gripping head on the holding bracket differ from one another in size and function. The bolt 52 which secures the outermost head to the free end of the U-shaped frame 44 is relatively short. It is threadedly engaged in the end of the frame and upon threaded adjustment will shift the clamping head toward or away from the plane of the upright members 14. The bolt 54 which supports the other gripping head on the U-shaped frame is relatively long and extends through the apertured end of the frame to abut the upright member 14 to which it is attached and also through the slot 20 of the latter to the other side thereof. Fixed on the end of the bolt 54 remote from the clamping head is a handle 56. The bolt is threadedly received in the end of the frame through which it extends and will upon rotation adjust the head toward or away from the other head. Threadedly received on the bolt 54 is a nut 58 which when tightened against the slotted member 14 through which the bolt extends will secure the holding device in any adjustable position. It is obvious that if the nut 58 is loosened, the device may be slidably adjusted along the slot of the member to which it is secured.

In Figs. 1 and 2 the apparatus carries four such holding devices on the upright members 14—14 of the apparatus. In the position illustrated in Figs. 1 and 2, which is one of many, the holding devices are capable of gripping the corners of an automobile door for holding the same against movement.

The apparatus is provided with one or more pressure devices which exert forces upon a given portion of an automobile member to be straightened and with the help of the holding devices heretofore described bend the part to the desired degree. One such pressure exerting device is illustrated in Fig. 6. It comprises a head 60 formed like the clamping heads previously described in that it has a circular metal backing plate and a face of rubber or similar cushioning material. The head 60 is attached to a stem 62 by a universal ball and socket 64 which allows the head to swing practically to any desired angle. The stem is externally threaded for a major portion of its length and is threadedly received in a block 66. The latter is shaped for sliding interlocking engagement with the two opposed flanges or side sections of the channel-shaped elements forming the cross member 32. As shown in Fig. 6, the block 66 is provided on opposite sides with grooves which receive opposed flanges of the channel-shaped elements forming a cross member. As a result, although the block 66 is held against movement toward or away from the head 60, it can travel laterally or sideways in the slot 34 of the cross member to different positions therealong. For the application of strong forces, a crank arm 68 is removably attached to the end of the stem. It is evident that upon rotation of the crank in one direction it will advance the head forwardly from the apparatus exerting a strong pushing force against any object that may be held by the holding devices previously described.

Other devices may be attached to the apparatus which exert a pulling force in contradistinction to the pushing force of the head 60. One such device is illustrated on the right of Fig. 11. It comprises a U-shaped bracket 70 like the U-shape frames previously described. The U-shaped bracket 70 is provided with an extension 72 on one end which feeds through the slot 34 in the cross member. On the outer or remote end of this extension is a flattened head 74 of less width than the slot 34 so that it may be inserted therethrough when parallel with the long dimension of the slot, and upon turning to a position generally transverse to the slot as shown in Fig. 11 it will function as a stop or anchor preventing withdrawal of the extension 72 from the slot. On the opposite end of the bracket 70 is a pressure exerting head 76 similar to that shown in Fig. 6, except that it threadedly engages in the end of the bracket rather than the sliding block 66. A crank handle 78 similar to crank arm 68 permits the operator to thrust the head 76 against a part of an automobile gripped by the holding devices. Between the anchor 74 and the pressure exerting head 76, a force may be directed upon the part to be straightened which is opposite to a force exerted by the head 60 of the pressure clamp previously described.

Figs. 9 to 13 illustrate various uses of the apparatus in straightening out damaged or warped parts of automobiles while the part is still on the automobile. In Fig. 9 the apparatus has been positioned with the uprights 14—14 on the inside of an opened door of a vehicle. The drawing illustrates the operation of bending the top of the door inwardly evenly across the top. The outer or remote heads 48 of the holding devices 44 engage the outside surfaces of the door near the corners thereof. The inside heads of these devices are not needed in this operation and remain free of the door as shown. Two pressure devices 60—60 are carried on the cross member 32 and are arranged to impose an outward thrust or push upon the door just below the window. By turning the crank arms 68 of both these devices at the same time the major portion of the door below the window will be forced out while the top is held from outward movement. The result is the top is pulled inward with respect to the rest of the door.

In Fig. 10 the apparatus is in position to pull out the left portion of the upper edge of the door. Force exerted by the single pressure device 60 on the cross bar causes the left upper section of door viewed in Fig. 10 to pull outward from the direction of automobile body. The upper and lower clamping devices grip the opposite sides of the door and take the twisting reaction set up holding the apparatus in place.

In Fig. 11, the apparatus is illustrated in full lines in operating position for pulling out the edge of the door. The clamping devices grip the corners of the door. Force exerting device 70—76 presses the middle section of the outer edge outwardly away from the body of the vehicle and toward the apparatus.

The dotted outline of the cross member 32 in Fig. 11 shows a position this member may assume when it is desired to exert pressure on the upper right corner of the door twisting it inwardly with respect to the rest of the door. The clamp in the upper right corner of the apparatus in Fig. 11 should be hoisted above and clear of the door to allow the corner section to be bent inwardly.

In Figs. 12 and 13 the apparatus is shown in operating positions for straightening out the bumpers on an automobile. In Fig. 12 the apparatus is being used for pulling out the end of an automobile bumper. A thrust exerting device like that illustrated in Fig. 6 imposes a pressure on a middle portion of the bumper holding the same from outward movement. A pulling device 70, 76 (Fig. 11) without the extension 72 straddles the end of the bumper and the cross member 32. It is obvious that upon rotating the handle attached to the head 76 to thrust the latter forward, the distance between the head and the opposite end of the U-shaped frame 70 will gradually reduce, thus pulling the less resisting end of the bumper outward.

In Fig. 13, the apparatus is shown in position for straightening out the middle portion of a bumper. The same U-shaped clamp 70, 76 is used but in this instance it is mounted to straddle the middle portion of the bumper and the cross member 32. Two thrust exerting device 60—68 are used on the end sections of the bumper to hold these parts against outward movement.

It is obvious that the apparatus may be used in various other ways for straightening damaged or warped parts of the doors and bumpers of automobiles. The adjustability of the cross member 32 and the clamp and pressure devices enables the apparatus to be brought into proper position for exerting the right degree of bending force on the door or bumper to straighten out the defective part. The ready movement of the apparatus over the floor and the ability to incline the upright structure from the vertical contribute to its adaptability and universal application. In addition to its use on doors and bumpers illustrated in the drawings, the apparatus may be used to straighten out damaged parts of the trunk compartment door. The holding and pressure exerting devices may be brought to bear on the trunk compartment similar to the application on the bumper in Fig. 13. Other applications of the apparatus suggest themselves and it is understood that the scope of the invention is not limited to the specific uses illustrated and described herein.

In Fig. 14 there is illustrated a modification of the invention utilizing only one slotted upright member 14'. It is pivotally mounted on a movable base 10' similar but narrower than the platform 10 previously described. Means similar to that previously described may be provided for limiting the swinging movement of the upright member to a few degrees on either side of the vertical. A cross bar 32' is slidably and pivotally attached to the upright member. Holding clamps 46' may be adjustably carried by the upright member and pressure devices 60' by the cross member.

The previous illustrated embodiments of the invention have shown the invention applied to parts on the automobile. The apparatus, however, may be used to support defective parts removed from the automobile while certain repairs are made on the part. A door removed from the automobile may be supported by the apparatus in horizontal position. The door is clamped between the holding devices so that it is held immovable with respect to the apparatus. The apparatus in turn is supported in horizontal position at the proper height from the floor by a novel brace or rack.

What I claim:

1. A tool for straightening parts of automobiles comprising, in combination, a horizontal base member, wheels on said base member for movement over a floor, an upright structure carried by said base member extending to the height aproximating that of an automobile body, a cross member, means for adjustably securing said cross member to said upright structure in various positions in the plane of the structure, clamping devices for engaging opposite sides of a part of an automobile and operable to exert pressure thereon, means for securing certain of said clamping devices to said structure and others of said devices to said cross member and permitting adjustment thereof to various positions on the structure and on the cross member and pressure plates slidably supported by one of said members for adjustment longitudinally thereof and releasably attachable thereto at adjusted positions, said pressure plates operable to exert pressure upon an automobile body part held by said clamping devices.

2. A straightening tool for automobile doors and the like comprising, in combination, an upright structure, a cross member, means for securing said cross member to said upright structure for adjustment vertically, horizontally and angularly in one plane, work engaging devices carried by said upright structure adapted to engage spaced parts of an automobile door or the like and hold the same against movement, means for slidably adjusting said devices to various positions on said structure, a force exerting device, and means for detachably securing said force exerting device to either the upright structure or the cross member at adjusted positions thereon, said force exerting device adapted when thus secured to exert forces on a portion of an automobile door or the like upheld by said work engaging devices to bend the part relative to the remainder of the door or the like.

3. A straightening tool for automobile doors or the like including, in combination, a base member movable over a floor, a pair of upright slotted members hingedly secured to the base member for limited pivotal movement as a unit, a slotted cross member extending between the two upright members, fastening means extending through the slots of the upright members and the slot of the cross member and releasably clamping the latter to the former, said fastening means adapted upon being released to permit translational movement of the cross member both horizontally and vertically with respect to the upright member, pressure plates slidably supported within the slot of the cross member and the slots of the upright members for adjustment therethrough, means fastening each pressure plate at adjusted positions within its slot, each pressure plate operable at any adjusted position toward and away from its supporting member to exert pressure upon an automobile body part.

4. A tool for holding and straightening automobile parts including, in combination, a base member movable over a floor, a pair of upright members provided with longitudinal slots opening out through the opposite sides thereof, means securing the bottom ends of said members to said base member in spaced parallel relationship and with the slots therein directed perpendicularly to the plane in which the two members are disposed, a cross member provided with a longitudinal slot opening out through opposite sides thereof, means extending through the respective slots of said cross member and said upright members slidably coupling the former to the latter permitting adjustment of the cross member vertically and horizontally of the upright members, means adapted to clamp the cross member to each upright member in any adjusted position, U-shaped brackets slidably supported within the slot of the cross member and the slots of the upright members for adjustment therethrough, means securing said brackets at adjusted positions, oppositely inwardly facing pressure plates carried by opposite ends of each bracket and relatively adjustable toward and away from each other, and other pressure plates slidably supported within the slots of said members for adjustment and operable to exert pressure upon work held between the pressure plates of the brackets.

5. A tool for holding and straightening automobile parts comprising, in combination, a pair of longitudinally extending members arranged in parallel spaced relationship, said members each provided with a longitudinal slot running substantially the length thereof and opening out through the opposite sides thereof perpendicularly to the plane in which the two members are disposed, a cross member of greater length than the distance separating said longitudinal members, said cross member likewise provided with a longitudinal slot extending substantially the length thereof and opening out through the opposite sides thereof in the same direction as the slot in said longitudinal members, fastening means extending through the respective slots of said cross member and said pair of members slidably coupling the former to the latter for adjustment lengthwise the pair of members and lengthwise the cross member, means for clamping said cross member to said longitudinal members in any adjusted position, devices for engaging one or both sides of a part of an automobile and exerting pressure thereon, said devices each provided with an extension adapted to be slidably received in the slot of said members for adjustment lengthwise thereof and means for clamping said devices to said members in any adjusted position.

6. A tool for holding and straightening automobile parts comprising, in combination, a pair of upright members arranged in spaced parallel relationship, said members each provided with a longitudinal slot running substantially the length thereof and opening out to the opposite sides thereof perpendicularly to the plane in which the two members are disposed, a cross member having a greater length than the distance separating said longitudinal members and likewise provided with a longitudinal slot running substantially the length thereof and opening out to the opposite sides thereof, pins extending through the slots of said longitudinal members and the slot of said cross member slidably coupling the latter to the former and permitting bodily movement of the cross member vertically and horizontally along the longitudinal members, means for clamping said cross member in any adjusted position on said longitudinal members, U shaped brackets, an extension on each bracket adapted to be slidably and pivotally received in the slots of said members, means for clamping the extension of each bracket in said members in any adjusted position, and oppositely inwardly facing pressure plates carried by opposite ends of said brackets adapted to engage opposite sides of an automobile body part and operable to exert a pressure thereon.

7. A tool for holding and straightening automobile parts comprising, in combination, a base movable over the floor, a single upright member attached to said base and permitted a limited swinging movement from the vertical, said member having a slot running substantially the length thereof and opening out through the opposite sides thereof, a slotted cross member, fastening means extending through the respective slots of said members and slidably and pivotally coupling the cross member to the upright member, means for clamping the cross member to said upright member in any adjusted position, and devices for engaging a part of an automobile and exerting pressure to straighten the same, said devices having means entering the slots of said members and slidably coupling the same to the members for adjustment.

8. In combination, a longitudinally slotted upright structure, a longitudinally slotted cross bar supported upon said upright structure for adjustment vertically, horizontally and angularly within the same vertical plane, means for adjustably securing the cross bar to the upright structure at such adjusted position, a plurality of pressure plate devices, certain of said devices slidably supported within a slot of the upright structure for adjustment therealong, certain other of said devices slidably supported within said slot and the cross bar for adjustment therealong, each device adapted to be secured at said adjusted positions, certain of said pressure devices adapted to be urged in one direction against a part of an automobile body and certain other of said devices adapted to be urged in the opposite direction against said part of the automobile body to subject the same to oppositely directed pressure forces, said upright structure supported to be swung towards and away from the automobile body.

9. A tool for straightening parts of an automobile comprising, in combination, a horizontal base, an upright structure consisting of a pair of substantially coplanar members pivotally secured to said base about a horizontal axis, means for supporting said structure in an upright position but permitting the structure to have a limited swinging movement from the vertical about said axis, pressure exerting devices carried by the said structure in offset relation thereto adapted to engage opposite sides of a part of an automobile body, such as a door, and means associated with each device operable to cause the same to exert pressure on such part in opposite directions normal to the plane of the structure.

10. In combination, an upright structure, a cross bar supported upon said structure for adjustment vertically, horizontally, and angularly within the same vertical plane, means for adjustably securing the cross bar to the upright structure at such adjusted position, a plurality of pressure plate devices, certain of said devices being slidably supported by the upright structure for adjustment therealong, certain other of said devices being slidably supported by the upright structure and the cross bar for adjustment therealong, each device being adapted to be secured at said adjusted positions, certain of said pressure devices being adapted to be urged in one direction against a part of an automobile body and certain other of said devices being adapted to be urged in the opposite direction against said part of the automobile body to subject the same to oppositely directed pressure forces, said upright structure being supported to permit swinging toward and away from the automobile body.

11. Mechanism of the class described comprising, in combination, a pair of substantially coplanar elements constituting a frame, means for positioning the same in substantially vertical position, work engaging members carried by said frame in slidable engagement therewith each having a work engaging face in offset relation to the plane of the frame, releasable means for securing said work engaging members fixedly to said frame, a pressure device carried by said frame in slidable engagement therewith and having a pressure exerting face disposed in opposed relation to the faces of said work engaging members, said frame and pressure device being so constructed and arranged with reference to one another that the pressure device is universally adjustable in the frame and with respect to the plane thereof, releasable means for securing said pressure device fixedly to the frame, and means for causing said pressure face to exert a powerful thrust toward said work engaging faces.

12. The mechanism described in claim 11 wherein the work engaging faces are movable with reference to the work engaging members and the pressure exerting faces are movable with reference to the pressure device.

13. Mechanism of the class described including, in combination a frame comprising crossed bars slidably and pivotally secured to one another, releasable means for fixedly positioning the one with reference to the other in any adjusted position, means for positioning the frame in a substantially vertical position, work engaging members carried by one of said bars in slidable engagement therewith each having a work engaging face in offset relation to the plane of the frame, releasable means for securing said work engaging members fixedly to said bar, a pressure device carried by the other of said bars in slidable engagement therewith and having a pressure exerting face disposed in opposed relation to the faces of said work engaging members, releasable means for securing said pressure device fixedly to its supporting bar, and means for causing said pressure face to exert a powerful thrust toward said work engaging faces, said means for positioning the frame in a substantially vertical position being so constructed and arranged as to permit limited swinging movement about the frame base in opposite directions.

14. Mechanism of the class described including, in combination, a substantially upright frame comprising crossed bars slidably and pivotally secured to one another, releasable means for fixedly positioning the bars with reference to one another in any adjusted position, means for positioning the frame in substantially vertical position while permitting limited swinging movement about a horizontal axis in either direction, spaced work engaging members carried by certain of said bars in slidable engagement therewith, releasable means for securing each work engaging member fixedly to its supporting bar, a pressure device including a pressure exerting face carried by certain other of said bars in slidable engagement therewith, releasable means for securing said pressure device fixedly to its supporting bar, and means for causing said pressure face to exert a powerful thrust against work positioned by said work engaging members.

GEORGE M. GRAHAM.